United States Patent [19]

Olry et al.

[11] Patent Number: 5,132,169
[45] Date of Patent: Jul. 21, 1992

[54] COMPOSITE MATERIALS HAVING MULTIDIRECTIONAL REINFORCEMENT TEXTURES MADE ESSENTIALLY OF CERAMIC FIBERS HAVING A SILICON COMPOUND BASE

[75] Inventors: Pierre Olry; Jacques Thebault, both of Bordeaux, France

[73] Assignee: Societe Europeenne De Propulsion, Sureness, France

[21] Appl. No.: 804,827

[22] Filed: Dec. 6, 1991

Related U.S. Application Data

[62] Division of Ser. No. 416,658, Oct. 3, 1989.

[30] Foreign Application Priority Data

Oct. 6, 1988 [FR] France ............................ 88 13132

[51] Int. Cl.$^5$ ................................. B32B 5/06
[52] U.S. Cl. ................... 428/300; 428/367; 428/902; 501/88; 501/95; 501/96
[58] Field of Search ............ 428/300, 408, 367, 902; 501/88, 95, 96

[56] References Cited

U.S. PATENT DOCUMENTS

| | | | |
|---|---|---|---|
| 4,642,271 | 2/1987 | Rice | 428/902 |
| 4,888,311 | 12/1989 | Davidovits et al. | 428/902 |
| 4,931,358 | 6/1990 | Wahl et al. | 428/902 |
| 4,992,318 | 2/1991 | Gadkaree | 428/902 |
| 5,015,540 | 5/1991 | Borom et al. | 428/902 |
| 5,026,604 | 6/1991 | Thebault | 428/902 |
| 5,057,465 | 10/1991 | Sakamoto et al. | 428/902 |
| 5,071,700 | 12/1991 | Sugino et al. | 428/300 |
| 5,075,160 | 12/1991 | Stinton et al. | 428/367 |

*Primary Examiner*—James J. Bell
*Attorney, Agent, or Firm*—Weingarten, Schurgin, Gagnebin & Hayes

[57] ABSTRACT

In order to obtain a reinforcement texture made essentially of silicon compound based ceramic fibers in the production of a composite material, the fibers are spun from a ceramic presursor in the molten state, after which they are submitted to a partial cross-linking in view of making the fibers infusible. The cross-linking of the fibers in the precursor in the infusible state is continued and, while they are maintained in the organic state, the cross-linked fibers are submitted to one or several textile-forming operations, such as weaving, layering, needling . . . in order to arrive at the multidirectional texture. Then, the texture is submitted to a heat treatment by pyrolysis to induce the ceramic state of the fibers and so obtain the required texture, which is essentially made of ceramic fibers having a silicon compound base, in particular silicon carbide.

3 Claims, 2 Drawing Sheets

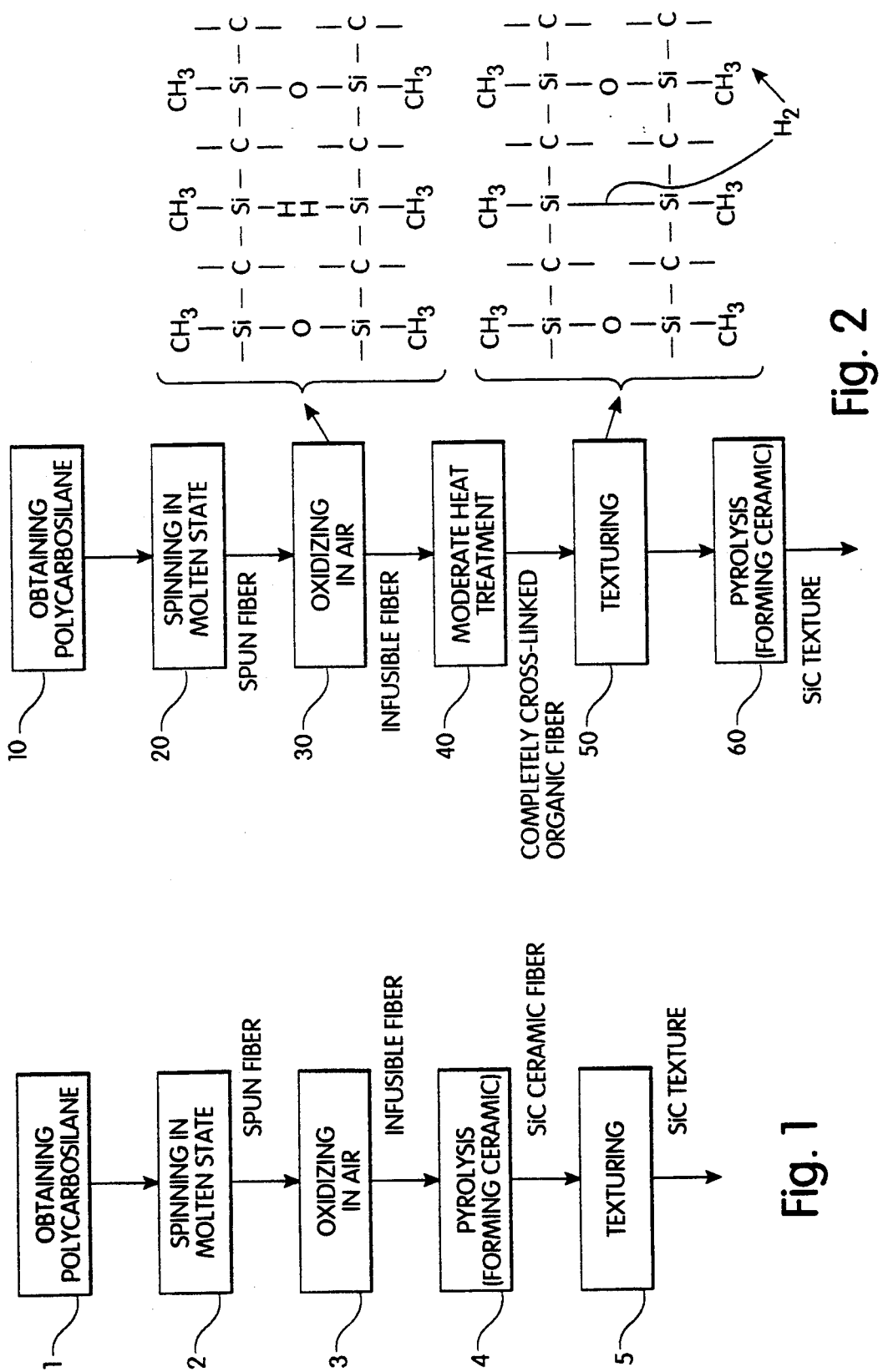

COMPOSITE MATERIALS HAVING MULTIDIRECTIONAL REINFORCEMENT TEXTURES MADE ESSENTIALLY OF CERAMIC FIBERS HAVING A SILICON COMPOUND BASE

This application is a division of application Ser. No. 07/416,658, filed Oct. 3, 1989.

BACKGROUND OF THE INVENTION

1. Field of the Invention

The present invention relates to the manufacture of multidirectional reinforcement textures made essentially of ceramic fibers having a silicon compound base, or the production of composite materials.

2. Prior Art

The manufacture of silicon compound based ceramic fibers from precursors containing silicon is known in the art. The precursors are silicon-based organometallic compounds, especially those belonging to the family of polycarbosilanes. These compounds yield a silicon compound based ceramic material when heat treated at a temperature exceeding 800 degrees Celsius in a controlled atmosphere (nitrogen, argon, vacuum, ammonia gas, ... ).

Some of the silicon organometallic compounds are spinnable and can hence yield fibers made of a silicon compound based ceramic material. The following description shall only cover the case of fibers made principally of silicon carbide, designated SiC fibers. But the scope of the invention also encompasses silicon compound based fibers other than SiC fibers that are derivable from spinnable silicon organometallic compounds.

A well-known process for the manufacture of SiC fibers comprises the following steps:

preparing a precursor consisting of a polycarbosilane (PCS), fusing the precursor and spinning fibers, oxidizing the fibers in air to render them infusible, and performing a ceramic inducement of the oxidized PCS fibers by pyrolysis at up to approximately 1300 degrees Celcius.

Such a process is described in an article by Y. Hasegawa, M. Iimura and S. Yajima published in "Journal of materials Science" 15 (1920) pp. 720-728.

The manufacture of multidirectional textures usable as reinforcement textures for fiber-based composite materials implies carrying out textile-forming mechanical operations on the fibers, e.g. weaving, layering, carding, needling, etc. To that end the fibers must be able to withstand these textile-forming operations and not have their final mechanical properties deteriorated in the process. Yet, although SiC fibers obtained by the above process have a high mechanical strength, they have only a small breaking strain (less than 2%), and are consequently too fragile to undergo certain textile-forming operations, especially carding or needling.

A similar problem is encountered with carbon fibers used in the manufacture of multidirectional reinforcement textures for composite materials, especially of the carbon-carbon type. A carbon precursor commonly used in the manufacture of carbon fibers is polyacrylonitrile (PAN). The fibers obtained after transformation of PAN by a carbonizing heat treatment are too fragile to be submitted to certain textile-forming operations, especially needling. This is why in the manufacture of carbon fiber multidirectional textures the textile-forming mechanical operations are performed on PAN fibers in the preoxidized state, since in that state the fibers possess sufficient mechanical strength and breaking strain to withstand these operations without damage. The carbonizing heat treatment is then performed on the multidirectional texture made from preoxidized PAN fibers.

The above-described process for carbon fibers cannot be applied to known SiC fibers. Indeed, the precursor fiber (e.g. PCS) has negligible mechanical strength, even after the usual oxidation treatment in air. Hence, none of the above-described stages in the manufacture of SiC fibers yield fibers having all the characteristics required to make them capable of withstanding any type of textile-forming operation.

SUMMARY OF THE INVENTION WITH OBJECTS

One object of the present invention is to provide a process for the manufacture of a multidirectional reinforcement texture made of ceramic fibers having a silicon compound base, during which any type of textile-forming operation can be performed without deterioration of the fibers or of the mechanical characteristics of the texture obtained.

The above object is achieved by a process according to the invention which includes the steps of completing cross-linking of the fibers of precursor in infusible state, while maintaining said fibers in an organic state; submitting said cross-linked fibers to at least one textile-forming operation to form said multidirectional texture; and heat treating said texture by pyrolysis to cause ceramic inducement of said cross-linked fibers to obtain said texture made essentially of ceramic fibers based on a silicon compound.

Indeed, the applicant has discovered that, surprisingly, in going from fibers in a precursor in the infusible state, which have virtually no mechanical strength, to fragile ceramic-formed fibers that have a breaking strain of less than 2%, it is possible to pass an intermediate state in which the fibers acquire adequate mechanical strength while having a high breaking strain (which can reach 8%).

This intermediate state corresponds to an advanced cross-linking of the fibers of the infusible precursor. The advanced cross-linking occurs without increasing the oxygen rate in the fibers that have been made infusible by oxidation.

In the case of a PCS precursor, the remainder of cross-linking is carried out while submitting the fibers to a moderate heat treatment in a neutral atmosphere. This heat treatment is performed at a temperature in the range of 250 to 550 degrees Celsius over a time period of ½ h to 10 h, in a nitrogen or argon atmosphere.

By making it possible to easily achieve different textile-forming operations, such as two- or three-dimensional weaving, the invention serves to provide two- or three-dimensionally woven reinforcement textures essentially made of silicon-compound-based ceramic fibers, as well as composite materials, especially those having a ceramic matrix incorporating such textures.

Furthermore, by making it possible to carry out the needling process, the invention allows to obtain new products formed with multidirectional reinforcement textures made of silicon-compound-based ceramic fibers and comprising superposed bidirectional layers that are interconnected by needling, as well as to obtain composite materials incorporating such reinforcement structures within a matrix, especially a ceramic matrix.

BRIEF DESCRIPTION OF THE DRAWINGS

The invention shall be more clearly understood upon reading the following description, given as a non-limiting example, with reference to the accompanying drawings in which:

FIG. 1 is a flow chart showing the successive steps in the manufacture of an SiC fiber reinforcement texture in accordance with a prior art process;

FIG. 2 is a flow chart showing the successive steps in the manufacture of an SiC fiber reinforcement texture in accordance with the invention.

DESCRIPTION OF PREFERRED EMBODIMENTS

Figure 3:
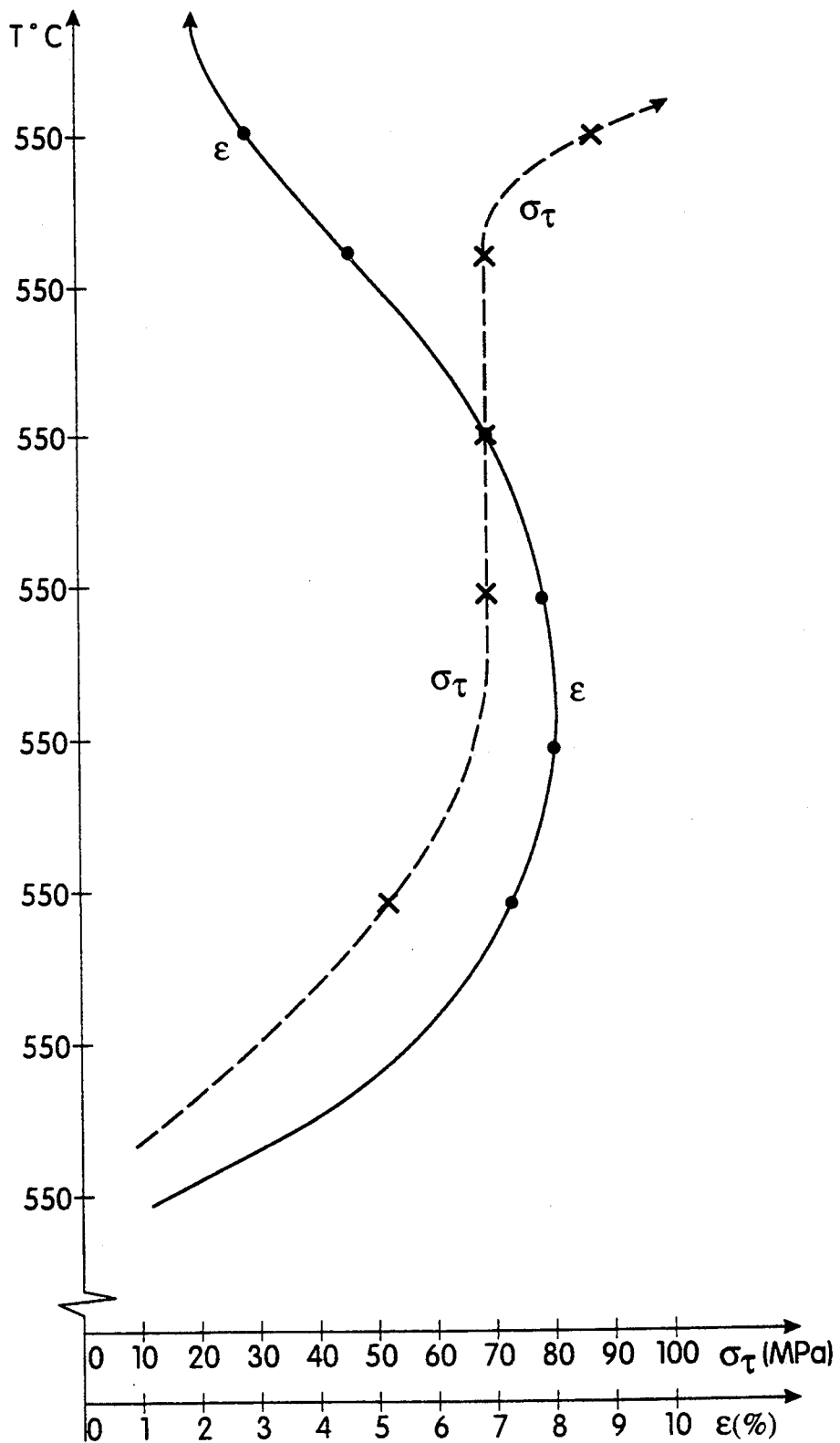
FIG. 3 shows curves illustrating variations in tensile strength and breaking strain of fibers made of oxidized PCS precursor, after heat treatment, as a function of the temperature at which the heat treatment was conducted.

As can be seen from FIG. 1, a known process for the manufacture of SiC fibers, such as "Nicalon" fibers produced by Nippon Carbon Co. Ltd. of Japan comprises the steps of:

obtaining a polycarbosilane or PCS (phase 1);

fusing the PCS at around 350 degress Celsius and spinning the PCS in the molten state in a neutral atmosphere ($N_2$) to obtain a spun fiber (phase 2).

oxidizing the spun fiber in air, at a temperature of around 190 degrees Celsius (phase 3), leading to a partial cross-linking of the PCS by oxygen, accompanied by an increase in weight (around 8 to 10%), and which is sufficient to make the fiber infusible; and heat treating the fibers in a neutral atmosphere ($N_2$ or Ar) up to a temperature of around 1300 degrees Celcius to induce the ceramic phase of the oxidized PCS fiber and transform the latter into an SiC fiber (phase 4).

A fibrous reinforcement fiber is then obtained, e.g. by weaving the SiC fiber (phase 5).

If a multidirectional felt or needled type fiber is required, it is necessary to employ mechanical textile-forming operations such as carding or needling. But SiC fibers have a breaking strain of less than 2%, and are thus too fragile to undergo such operations.

FIG. 2 shows a process according to the invention in which it is possible to obtain reinforcement textures that are at least partially of the felt or needled type and made of SiC fibers.

In common with the above-described prior art process, the process according to the invention shares the initial steps of:

obtaining a PCS (phase 10);

fusing the PCS at around 350 degrees Celsius and spinning the PCS in the molten state in a neutral atmosphere ($N_2$) to obtain a spun PCS fiber (phase 20); and oxidizing the spun fiber in air, at a temperature of at least 190 degrees Celsius (phase 30), which leads to a partial cross-linking of the PCS by oxygen and makes the fiber infusible.

Next, according to the invention, the PCS fiber in the infusible state is submitted to a heat treatment (phase 40) at a temperature below that which induces the ceramic state, i.e. below the temperature at which the organic fibers are transformed into mineral fibers. While oxidation of the PCS fiber (phase 30) corresponds to a limited cross-linking by oxygen (Si—O—Si bridging, as shown schematically in FIG. 2) which is sufficient to make the fibers infusible, the moderate heat treatment (phase 40)—which is possible since the fibers are infusible—allows the cross-linking to be terminated (Si—Si bridging with freeing of $H_2$, as shown schematically in FIG. 2) while maintaining the fibers in the organic state.

FIG. 3 shows how the tensile strength and breaking strain of fibers obtained after the moderate heat treatment varies as a function of the temperature at which the treatment was conducted. The measurements were carried out after temperature treatments lasting one hour.

While the oxidized PCS fiber has practically no tensile strength and the SiC fiber has a very low breaking strain, in contrast with its good tensile strength, there in fact exists an intermediate state, shown in FIG. 3, in which the fiber has sufficient tensile strength and breaking strain to undergo any textile forming operation, including carding and needling, without damage. Specifically, it has been observed that the breaking strain approaches 8% for a treatment temperature of around 350 to 400 degrees Celsius, with a corresponding tensile strength of 70 MPa. Lower treatment temperature values lead to lower measured tensile strength and breaking strain values. Preferably, the heat treatment should be carried out at a temperature of at least 250 degrees Celsius. At higher temperatures, there is observed an increase in tensile strength but a fairly rapid decrease in breaking strain. The temperature should preferably not exceed 550 degrees Celsius.

The heat treatment that completes the cross-linking of the PCS made infusible by oxidation is carried out in a neutral nitrogen or argon atmosphere over a period of between ½ h to 10 h.

After the moderate temperature phase (40), the fiber—which is still in the organic state—is used to make the multidirectional reinforcement texture having the desired shape, without limitations as regards the textile-forming operations to be carried out.

The fiber can thus be used e.g. to form a fabric (two dimensional structures) that can be arranged in superposed layers (layed flat or wound) and are interconnected by needling or by implanting yarns through the layers. The fiber can also be reeled and cut into sections of predetermined length (e.g. 60 mm) in view of a subsequent carding operation to produce a carded web. Several layers of carded web are superposed by layering and assembled by light needling to produce a fibrous material product that is similar to thin felt. The thus-formed product can be assembled by moderate needling with a fabric of same material to obtain a two-dimensional structure that can in turn be arranged in superposed layers that are interconnected by needling or by implanting yarns.

Generally speaking, the fiber obtained after the moderate heat treatment phase can be used to produce multidirectional reinforcement textures using the known procedures employed on fibers from a preoxidized carbon precursor (polyacrylonitrile) in the manufacture of carbon reinforcement textures for carbon-carbon or carbon-SiC composites. Such processes are covered e.g. U.S. Pat. Nos. 4,621,662, 4,790,052, and 4,628,846.

Once the reinforcement has been formed, it is submitted to a ceramic inducement process (phase 60) at a temperature in the range of 1000 to 1300 degrees Celcius to transform the organic fibers into SiC fibers by pyrolysis and hence obtain the required SiC fiber texture.

The SiC fiber texture is intended to constitute a reinforcement texture for composite materials, preferably of the ceramic matrix type. The matrix material, e.g. silicon carbide, is infiltrated through the porosity of the reinforcement texture. The matrix material can be deposited by a chemical vapor infiltration process, possibly after covering the reinforcement fibers with an intermediate coating consisting of e.g. laminar pyrocarbon or boron nitride, in view of improving the fiber-matrix interface. A process for manufacturing composite materials having a fibrous reinforcement made of refractory fibers, in particular SiC, and a ceramic matrix is disclosed in U.S. Pat. No. 4,752,503.

Finally, it is noted that a stretching of the fiber is observed in the course of the inventive process, between the spinning phase and the end of the moderate heat treatment phase. As a consequence, there occurs a loosening of the wound yarn during spinning, making it easier to unwind the yarn obtained after the moderate heat treatment phase.

Obviously, the ability of the fibers obtained after moderate heat treatment to withstand textile-forming operations can be exploited to produce not only needled textures, but also textures woven by two- or three-dimensional weaving.

Also, as already explained above, the invention applies not only to SiC fibers, but also to any other fiber having a silicon compound base derived from spinnable silicon organometallic compounds and whose elaboration involves a cross-linking completion operation in view of making the fibers capable of withstanding textile-forming operations.

What is claimed is:

1. A composite material having a multidirectional fibrous reinforcement texture embedded in a matrix, wherein said texture comprises superposed needled two-dimensional fibrous layers essentially made of ceramic fibers having a silicon compound base.

2. A composite material as claimed in claim 1, wherein said fibers are made essentially of silicon carbide.

3. A composite material as claimed in claim 1, wherein said matrix is made of a ceramic material.

* * * * *